(12) United States Patent
Yilma et al.

(10) Patent No.: US 10,384,522 B2
(45) Date of Patent: Aug. 20, 2019

(54) TONNEAU COVER QUICK RELEASE REMOVABLE CONTINUOUS HINGE

(71) Applicant: Ford Global Technologies, LLC, Dearborn, MI (US)

(72) Inventors: Benjamin Yilma, Canton, MI (US); Pattrick Loew, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 40 days.

(21) Appl. No.: 15/726,684

(22) Filed: Oct. 6, 2017

(65) Prior Publication Data

US 2019/0105975 A1    Apr. 11, 2019

(51) Int. Cl.
*B60J 9/00* (2006.01)
*B60J 7/14* (2006.01)
*B62D 33/02* (2006.01)

(52) U.S. Cl.
CPC .............. *B60J 7/141* (2013.01); *B62D 33/02* (2013.01)

(58) Field of Classification Search
CPC .................................. B60J 7/198; B60J 7/141
See application file for complete search history.

(56) References Cited

U.S. PATENT DOCUMENTS

| | | | |
|---|---|---|---|
| 6,227,602 B1 | 5/2001 | Bogard | |
| 6,439,640 B1 | 8/2002 | Wheatley | |
| 6,533,344 B1 | 3/2003 | Patterson | |
| 6,883,855 B2 | 4/2005 | Chverchko et al. | |
| 7,484,788 B2 | 2/2009 | Calder et al. | |
| 9,004,571 B1* | 4/2015 | Bernardo | B60J 7/141 |
| | | | 296/100.03 |
| 9,421,850 B2 | 8/2016 | Shi et al. | |
| 9,555,735 B2* | 1/2017 | Kerr, III | B60P 7/02 |
| 2016/0340949 A1* | 11/2016 | Xu | E05D 5/14 |
| 2018/0093555 A1* | 4/2018 | Aubrey | B60P 7/02 |
| 2018/0147926 A1* | 5/2018 | Shi | B60J 7/198 |
| 2018/0312099 A1* | 11/2018 | Loew | B60P 3/14 |

FOREIGN PATENT DOCUMENTS

WO    2009/038025 A1    3/2009

* cited by examiner

*Primary Examiner* — Lori L Lyjak
(74) *Attorney, Agent, or Firm* — Carlson, Gaskey & Olds, P.C.

(57) ABSTRACT

A tonneau cover includes a hinge assembly including a first portion attached to a first panel and a second portion attached to a second panel. Each of the first portion and the second portion include release sections and secure sections and the second portion is detachable when moved to align the release sections with the secure sections. A method is also disclosed.

20 Claims, 8 Drawing Sheets

TONNEAU COVER QUICK RELEASE REMOVABLE CONTINUOUS HINGE

TECHNICAL FIELD

This disclosure relates to a tonneau cover for a cargo bed of a pickup truck that includes removable panels.

BACKGROUND

Pickup trucks often include a tonneau cover to enclose and protect items within a cargo bed. Tonneau covers can include hard panels or a soft flexible cover. The hard panels may be connected with a hinge to enable pivoting relative to each other for storage and to enable access to the cargo bed. The hinges are useful when all the panels are present, but can create difficulties when removal of one panel from the cover is desired to adjust cargo capacity or for an alternate use.

SUMMARY

A tonneau cover according to an exemplary aspect of the present disclosure includes, among other things, a hinge assembly including a first portion attached to a first panel and a second portion attached to a second panel. Each of the first portion and the second portion include release sections and secure sections and the second portion is detachable when moved to align the release sections with the secure sections.

In a further non-limiting embodiment of the foregoing tonneau cover, the first portion and the second portion include a cross-section that varies between the release sections and the secure sections along a length of the hinge assembly.

In a further non-limiting embodiment of any of the foregoing tonneau covers, the first portion includes a stationary hinge portion and the second portion comprises a removable hinge portion and the second hinge portion is movable about a pivot axis.

In a further non-limiting embodiment of any of the foregoing tonneau covers, the first portion and the second portion extend along the pivot axis and in a closed position release sections of the first portion are aligned with release sections of the second portion and secure sections of the first portion are aligned with secure sections of the second portion.

In a further non-limiting embodiment of any of the foregoing tonneau covers, in a release position, the second portion is rotated relative to the first portion and the secure sections of the first portion are aligned with release sections of the second portion and secure sections of the second portion are aligned with release sections of the first portion.

In a further non-limiting embodiment of any of the foregoing tonneau covers, the second portion is slide a distance relative to the first portion along the length of the hinge assembly to the release position.

In a further non-limiting embodiment of any of the foregoing tonneau covers, a plurality of secure sections alternate with a plurality of release sections along a length of both the first portion and the second portion of the hinge assembly.

In a further non-limiting embodiment of any of the foregoing tonneau covers, the distance that the second portion is slide relative to the first portion corresponds with a length of the secure sections and the release sections.

In a further non-limiting embodiment of any of the foregoing tonneau covers, each of the secure sections and the release sections are of equal length.

In a further non-limiting embodiment of any of the foregoing tonneau covers, the first portion defines a cavity and the second portion defines a pivot member receivable within the cavity.

In a further non-limiting embodiment of any of the foregoing tonneau covers, the first portion includes a stationary portion and the second portion defines a removable portion that is rotatable and slidable relative to the stationary portion.

In a further non-limiting embodiment of any of the foregoing tonneau covers, the second portion includes a stationary portion and the first portion defines a removable portion that is rotatable and slidable relative to the stationary portion.

In a further non-limiting embodiment of any of the foregoing tonneau covers, a seal is supported on one of the first portion and the second portion that extends the length of the hinge assembly.

In a further non-limiting embodiment of any of the foregoing tonneau covers, a locking pin prevents sliding movement between the first portion and the second portion.

In a further non-limiting embodiment of any of the foregoing tonneau covers, each of the first portion and the second portion include a channel receiving a corresponding one of the first panel and the second panel.

In a further non-limiting embodiment of any of the foregoing tonneau covers, a plurality of hinge assemblies are pivotally connected to a plurality of panels.

A method according to another exemplary aspect of the present disclosure includes, among other things, rotating a first panel upward relative to a second panel along a length of a hinge assembly pivotally connecting the first panel to the second panel, aligning release portions of a first portion of the hinge assembly with secure portions of a second portion of the hinge assembly, and lifting the first panel away from the second panel.

In a further non-limiting embodiment of the foregoing method, aligning the release sections of the first portion with secure sections of the second portion includes sliding the first panel a distance along the length of the hinge assembly less than the overall length of the hinge assembly.

In a further non-limiting embodiment of any of the foregoing methods, includes locking the first panel to the second panel in a closed position with a locking pin.

In a further non-limiting embodiment of any of the foregoing methods, a length of each of the release sections and secure sections is equal to the distance that the first panel is slide relative to the second panel.

The various features and advantages of this disclosure will become apparent to those skilled in the art from the following detailed description. The drawings that accompany the detailed description can be briefly described as follows.

DETAILED DESCRIPTION

Figure 1A:
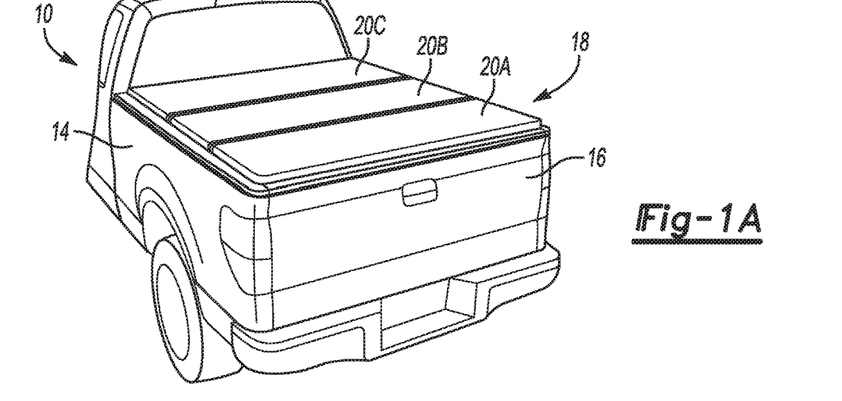
FIG. 1A is a perspective view of a pickup truck including a tonneau cover.
Figure 1B:
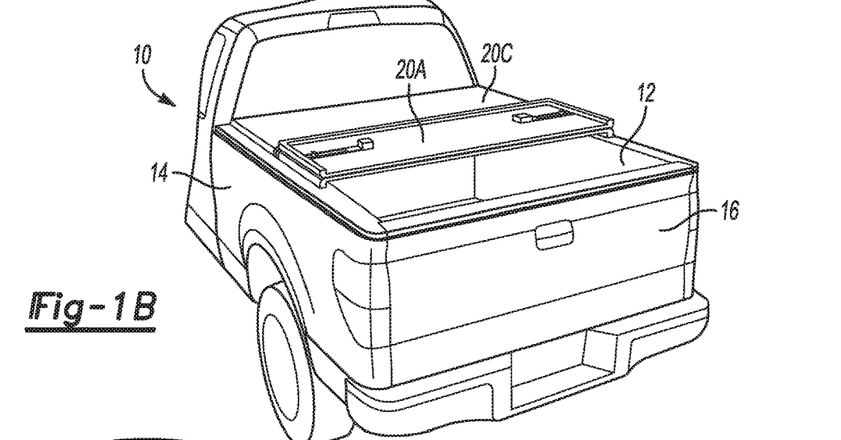
FIG. 1B is a perspective view of a pickup truck including a tonneau cover with a single panel folded over.
Figure 1C:
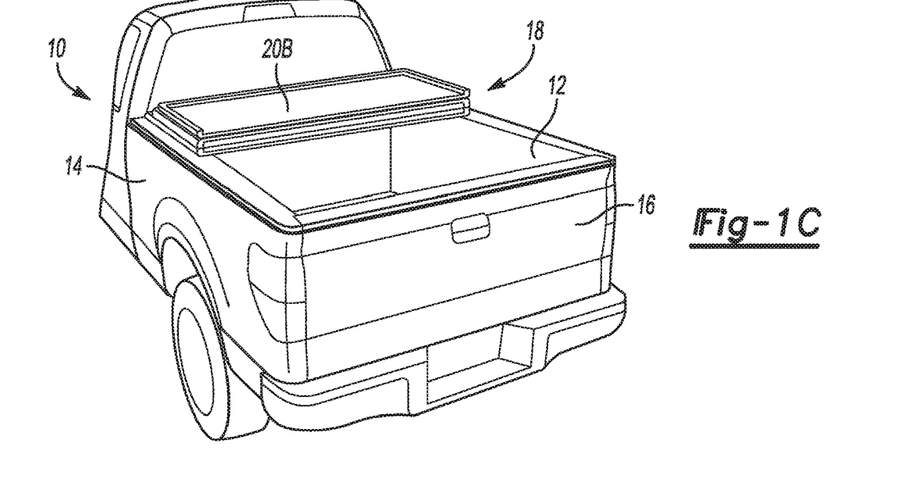
FIG. 1C is a perspective view of a cargo area for a pickup truck with a tonneau cover that is in a folded position.

Referring to FIGS. 1A, 1B and 1C, a pickup truck 10 includes a cargo area 12 covered by a tonneau cover assembly 18. The tonneau cover assembly 18 includes a plurality of hard panels. In this example embodiment, the cover 18 includes three panels 20a, 20b and 20c. The cover 18 and the panels 20a-c are supported on side walls 14 of the pickup truck 10. The tailgate 16 is secured at a rear of the cargo area 12 and is moveable from a closed position shown in the Figures to an open position. The cover 18 includes hinges between the panels 20a-c that enable folding for storage and to adjust capacity of the cargo area 12. The panels 20a-c are foldable on to each other as is shown in FIGS. 1B and 1C. The hinge assemblies are configured such that each of the panels 20a-c may be folded onto a subsequent panel in a stacking manner as is shown in FIGS. 1B and 1C.

In some instances it is desirable to remove one of the panels 20a-c to enable access to the cargo area 12 or alternatively to use the removed one of the panels 20a-c for other uses separate from the entire cover assembly 18. For example, one of the panels 20a may be utilized as a table (not shown) separate from the other panels 20a-c.

Figure 2:
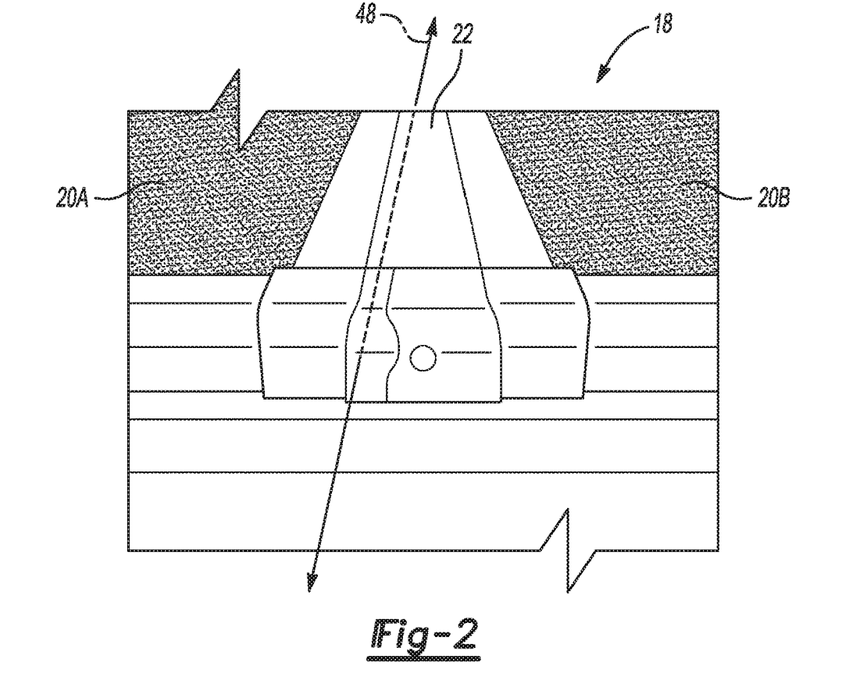
FIG. 2 is a side perspective view of a hinge assembly for an example tonneau cover in a closed position.
Figure 3:
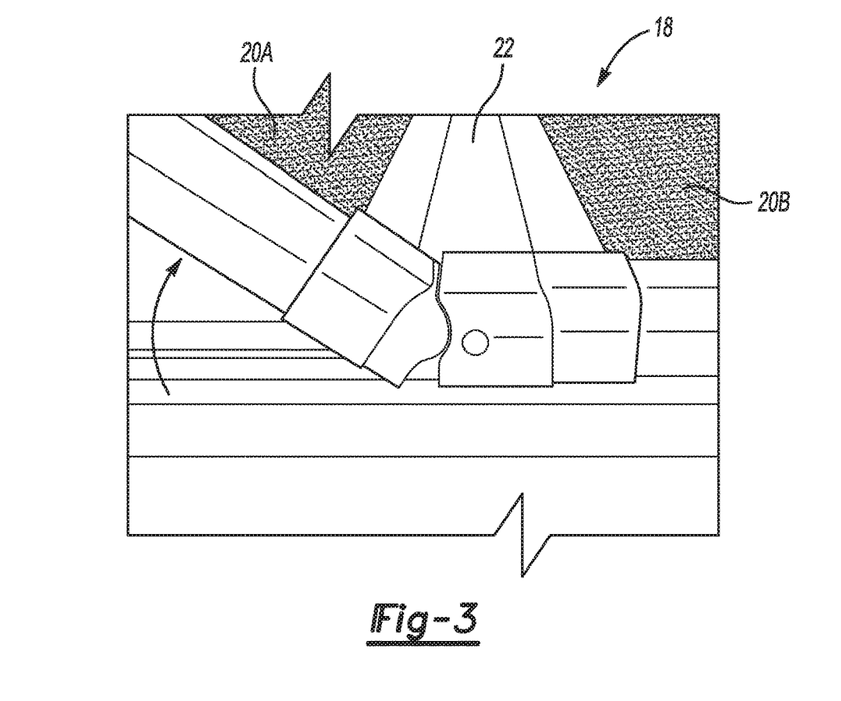
FIG. 3 is a side perspective view of the hinge assembly with a single panel rotated upwardly.
Figure 4:
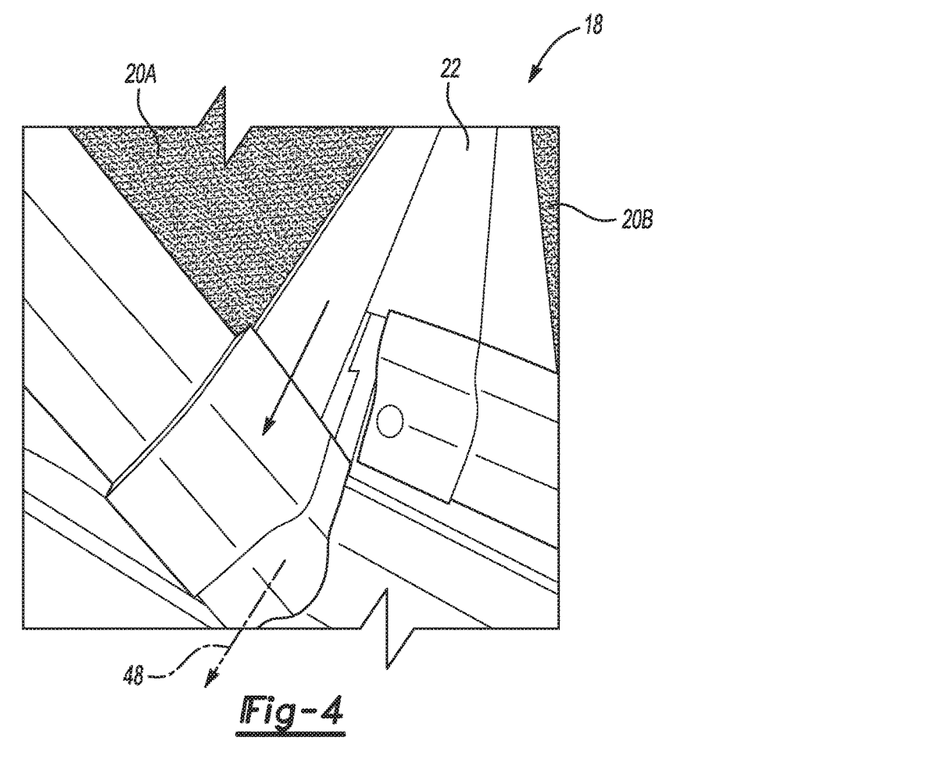
FIG. 4 is a side perspective view of the hinge assembly with a single panel slid to a release position.

Referring to FIGS. 2, 3 and 4 with continued reference to FIGS. 1A-C, the example tonneau cover 18 is shown in a side view with a hinge assembly 22 between a panel 20a and 20b. The hinge assembly 22 enables quick release and removal of one of the panels 20a from the other panels without additional tools. In the disclosed example, one of the panels 20a is rotated upwardly as shown in FIG. 3 and then slid along a pivot axis 48 as shown in FIG. 4. With the panel 20a lifted upward and slid outward, the panel 20a is removable from the hinge assembly 22 and the other panels 22b-c.

Figure 5:
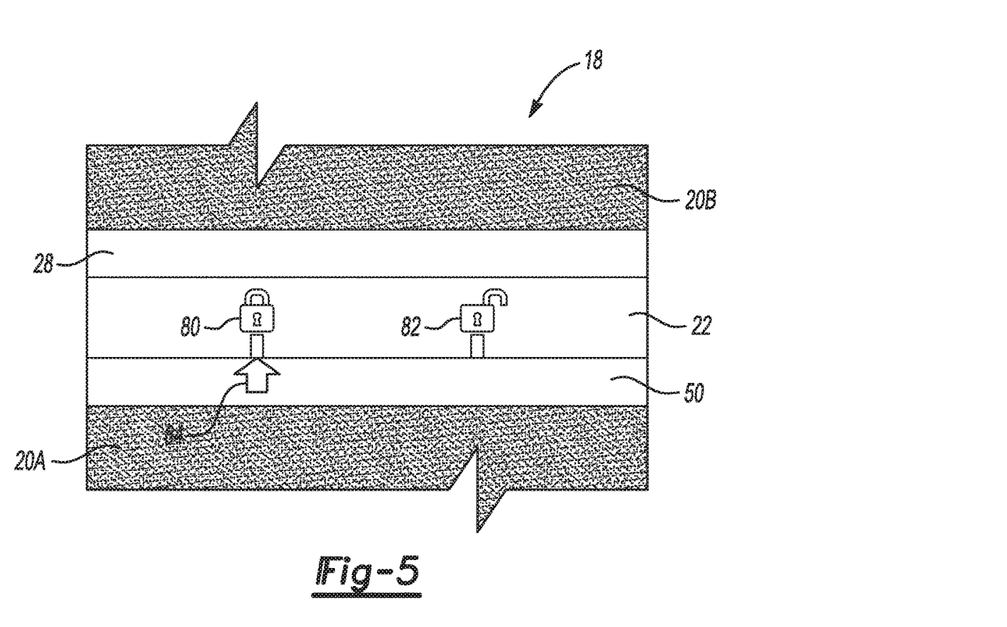
FIG. 5 is a top view of the hinge assembly including markings indicating a position of the tonneau cover.

Referring to FIG. 5 with continued reference to FIGS. 2, 3 and 4, the example hinge assembly 22 includes two mating portions that include different cross-sections that are alignable to provide quick release. The example hinge assembly 22 includes guide marks 80 and 82 to indicate proper alignment between a first portion 28 and a second portion 50. An arrow 84 is provided that indicates on the marks 80, 82 to indicate a position of a panel 20a. In this illustrated example, the panel 20a is shown in a closed and secured position. Sliding of the panel 20A from the locked position indicated by arrow 84 to the unlocked position enables removal of the panel by aligning different sections of the first and second portions 28, 50 of the hinge assembly 22.

Figure 6A:
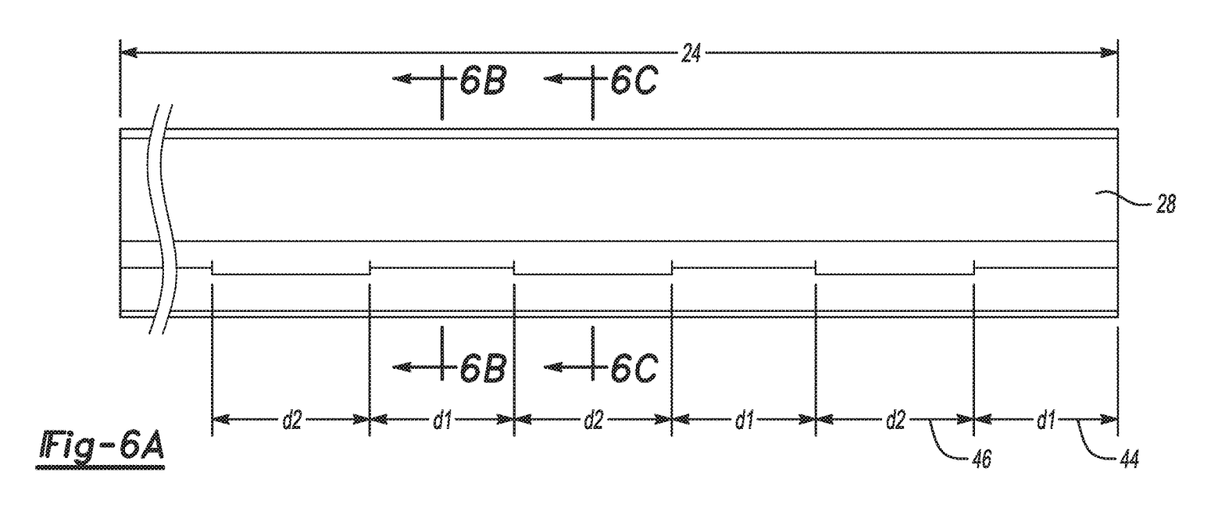
FIG. 6A is a top view of a first portion of an example hinge assembly.
Figure 6B:
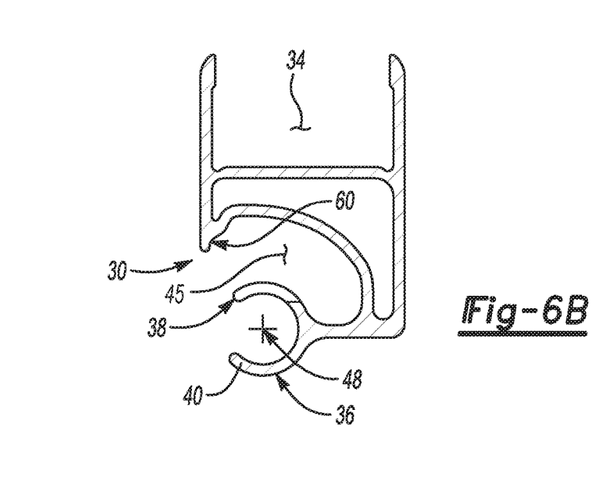
FIG. 6B is a cross-sectional view of a secure section of the first portion of the hinge assembly.
Figure 6C:
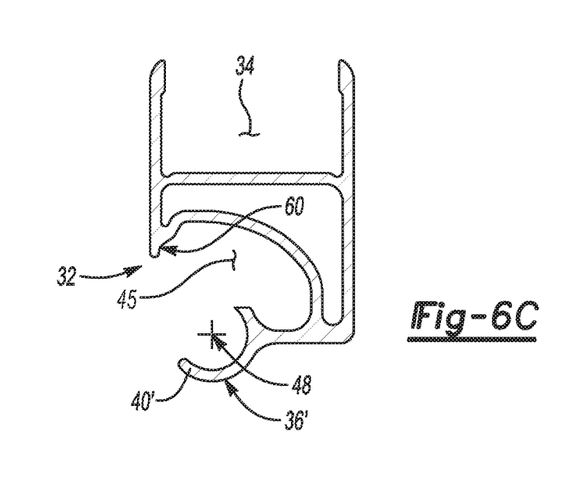
FIG. 6C is a cross-sectional view of a release section of the first portion of the hinge assembly.

Referring to FIGS. 6A, 6B and 6C, the first portion 28 of the hinge assembly 22 is shown and includes a secure section 30 and a release section 32. Both the secure section 30 and the release section 32 include a U-shaped channel 34 for attachment of a panel 20a-c. The secure section 30 and the release section 32 are spaced apart cross-sections of a single unitary extruded part that extends the length 24 of the hinge assembly 22. The cross-section 30 is alternated with the cross-section 32 along the length of the first portion 28. In this example, the first portion 28 of the hinge assembly 22 includes three of the secure sections 30 that are alternated with three of the release sections 32. As appreciated, there may be any number of secure sections 30 and release sections 32. For each secure section 30, there is provided a corresponding release section 32.

The secure section 30 shown in FIG. 6B includes a pivot member 36 with a first arm 38 and a second arm 40. The pivot axis 48 is defined at a center of the pivot member 36. The pivot member 36 is disposed adjacent to a curved slot 45. The curved slot 45 and pivot member 36 are integral portions of a common extruded part.

The release section 32 includes the first arm 40 like that in the secure section 30. The release section 32 includes the same curved slot 45 but only one of the two arms 38, 40. The two arms 38, 40 of the pivot member 36 engage parts of the second portion 50 to hold the hinge assembly 22 together. The removal of the second arm within the release section 32 enables disassembly of the hinge assembly 22 when properly aligned with the second portion 50.

Each of the secure section 30 and release sections 32 include a common width indicated at 46 and 44. The width 46, indicated as d2, is the same as width 44, indicated at d1, and are uniform across the length 24 of the first portion 28.

Figure 7A:
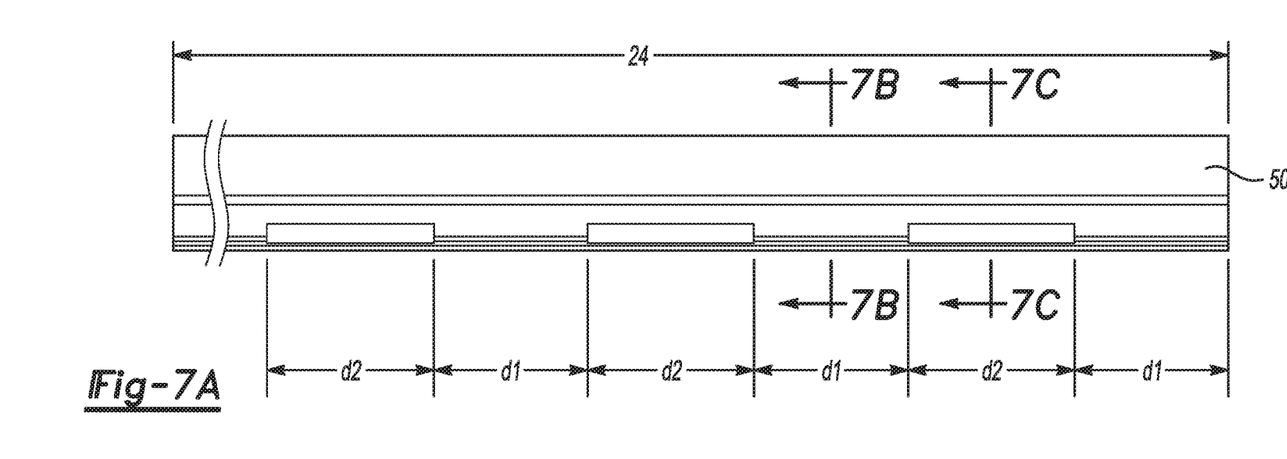
FIG. 7A is a top view of a second portion of the example hinge assembly.
Figure 7B:
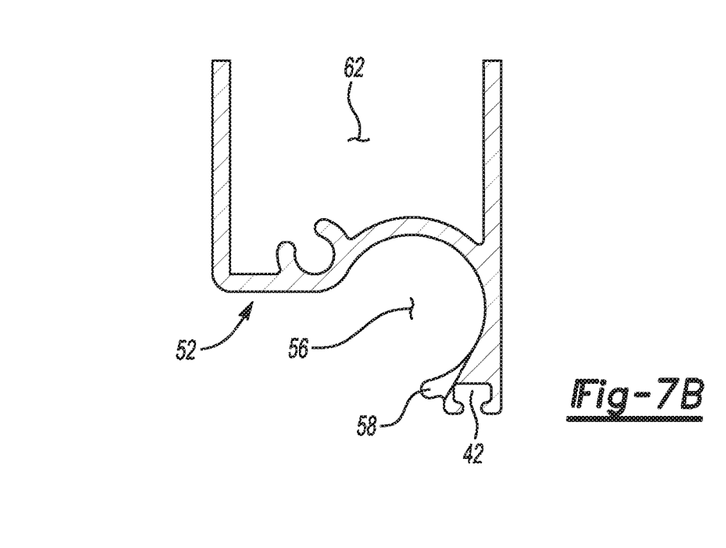
FIG. 7B is a cross-sectional view of a secure section of the second portion of the hinge assembly.
Figure 7C:
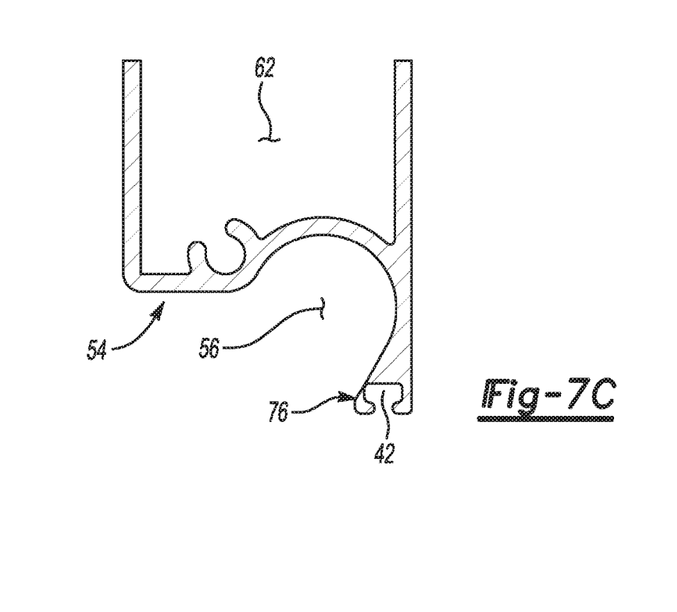
FIG. 7C is a cross-section of a release section of the second portion of the hinge assembly.

Referring to FIGS. 7A, 7B and 7C, the second portion 50 of the hinge assembly 22 is shown and includes a secure section 52 and a release section 54. The secure section 52 and release section 54 alternate along the length 24 of the second portion 50 and correspond to the width d1 and d2 of the first portion 28. In this example, there are three release section 54 and three secure sections 52. The number of secure sections 52 and release sections 54 correspond to the number of release sections 32 and secure sections 30 provided in the first portion 28. The secure section 52 and the release section 54 both include a cavity 56 that receives the pivoting member 36 of the first portion 28. The cavity 56 is bordered by a finger 58 within the secure section 52 that provides securement of the pivoting member 36 within the cavity 56. The first portion 50 also includes a slot 42 for receiving a seal along the entire length 24.

The release section 54 includes a taper 76 instead of the finger 58. The taper 76 enables release of the pivoting member 36 when properly aligned. Each of the release cross-section 56 and the secure cross-section 52 is disposed adjacent to the U-shaped channel 62. The U-shaped channel 62 is provided to receive and support attachment of a panel 20a-c to the hinge assembly 22.

Figure 8A:
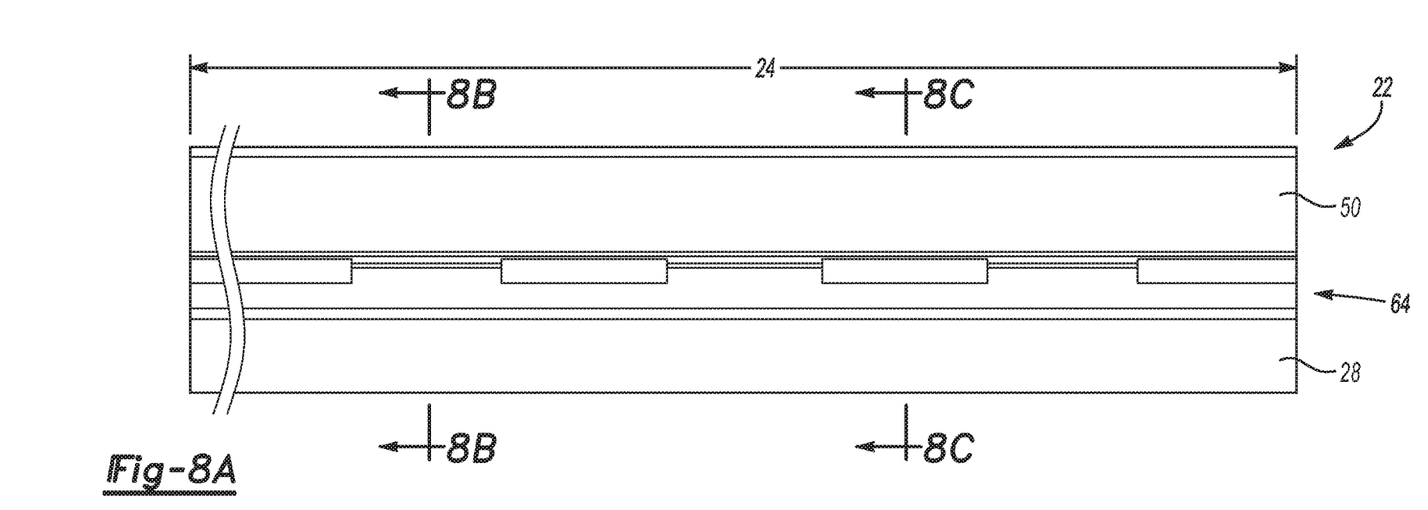
FIG. 8A is a top view of the hinge assembly in a closed, secured position.
Figure 8B:
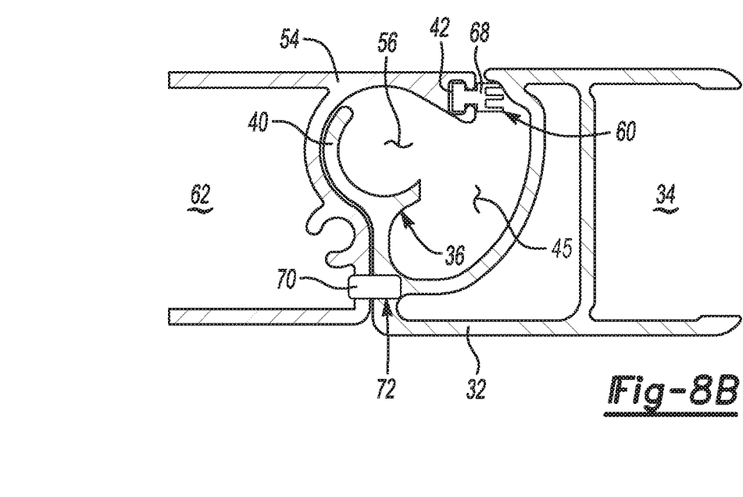
FIG. 8B is a cross-sectional view of a section of the hinge assembly in the closed and secured position.
Figure 8C:
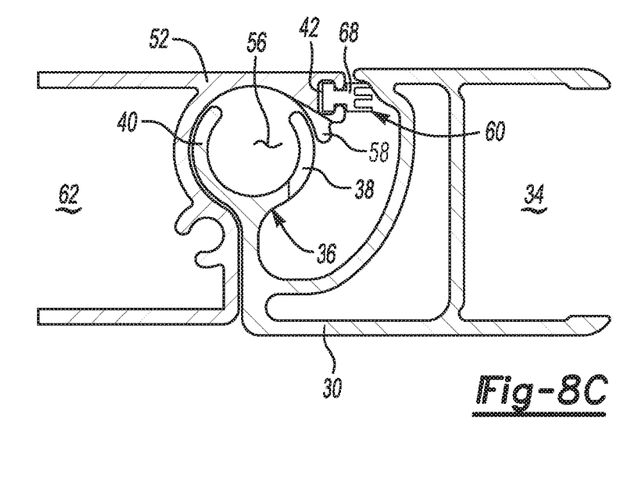
FIG. 8C is a cross-sectional view of another section of the hinge assembly in the closed and secured position.

Referring to FIGS. 8A, 8B and 8C, the hinge assembly 22 is shown in a secure position 64 with the first portion 28 engaged with the second portion 50. The example hinge assembly 22 is shown in a secured position where the panels 20a-c are secured together in a manner that enables pivoting relative movement. In the illustrated position, the hinge assembly 22 includes the first portion 28 aligned with the second portion 50 such that each of the respective release sections 54 and 32 are aligned with each other and each of the respective secure sections 52 and 30 are aligned with each other along the length 24 of the hinge assembly 22. The release sections 54 and 32 and secure sections 52 and 30 are aligned in an alternating manner beginning on one side of the hinge assembly 22 to the other distal side.

A locking pin 70 is secured within an opening 72 within the release section 32 of the second portion 50. The locking pin 70 restricts sliding movement between each of the first and second portions 28, 50 and thereby maintains the pivoting connection between portions of the hinge assembly 22. Rotation of the second portion 50 releases the pin 70 from the opening 72 to enable relative sliding movement.

A seal 68 is disposed within the seal slot 42 of the second portion 50. The pivoting member 36 is received within respective cavities 56 of the second portion 50 and enable relative rotation between the panels 20a-c.

In the secured position, the secured cross-sections 52 and 30 are aligned with one another and prevent separation of the hinge assembly 22. The pivot member 36 is guided on walls of the cavity 56 when one panel is pivoted relative to another panel. The curve of the walls of the cavity 56 correspond with a curve of the arms 38, 40 of the pivot member 36. The first portion 28 includes a seal face 60 and the seal 68 engages the seal face 60 when in the closed position. The seal 68 and seal face 60 substantially prevent water and debris incursion into and through the hinge assembly 22.

Figure 9A:
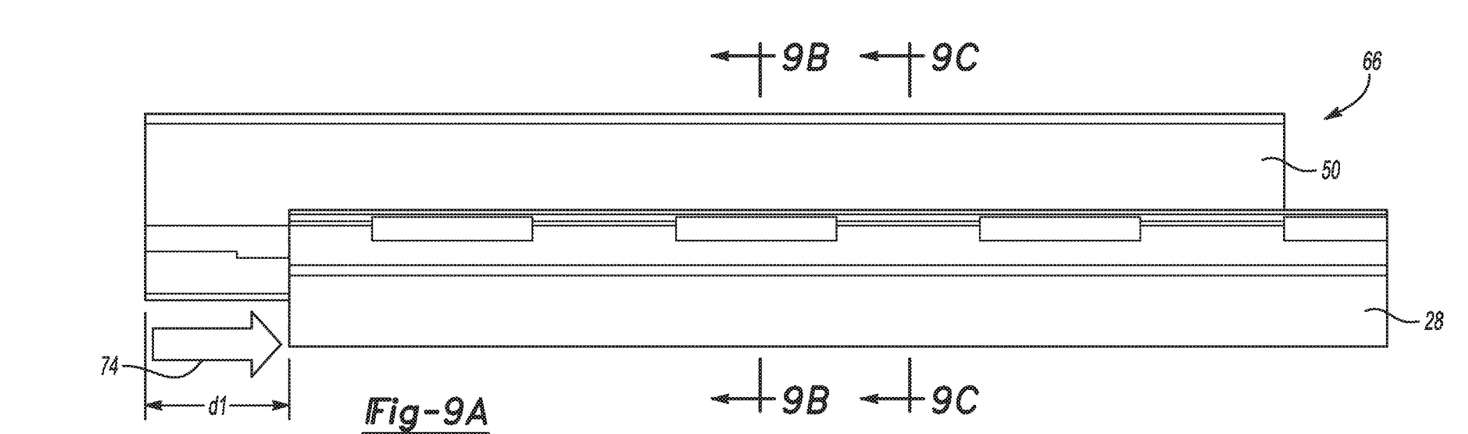
FIG. 9A is a top view of the hinge assembly in a release position.
Figure 9B:
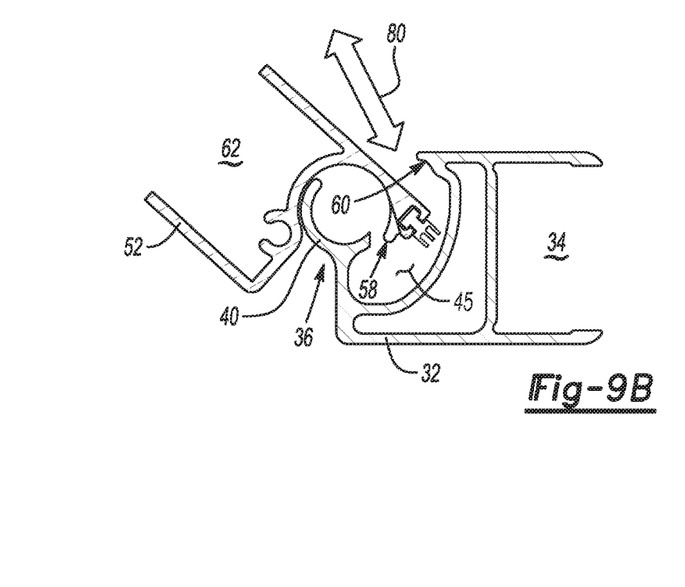
FIG. 9B is a cross-sectional view of a section of the hinge assembly in the release position.
Figure 9C:
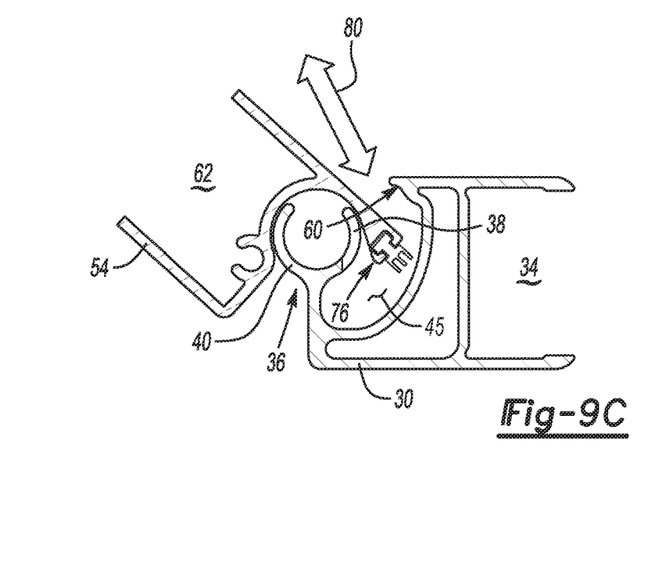
FIG. 9C is a cross-sectional view of a section of the hinge assembly in the release position.

Referring to FIGS. 9A, 9B and 9C, the example hinge assembly 22 is shown in a release position 66. In the release position 66, the second portion 50 is rotated upward relative to the first portion 28 to release the pin 70. The second portion 50 is also slid along the length of the hinge assembly 22 a distance 74. The distance 74 corresponds with a width of the release sections 54, 32 and the secure sections 52, 30. The sliding distance 74 aligns the secure sections 52, 30 of one portion 28, 50 with a release section of the other portion 28, 50. Accordingly, in FIG. 9B, the release section 32 of the first portion 28 is aligned with the secure section 52 of the second portion 50. This alignment aligns the pivoting member 36 including a single arm 40 with the secured portion 52 that includes the finger 58. Because the pivoting portion 36 includes only the single arm 40, the finger 58 is able to be move unobstructed from the first portion 28.

FIG. 9C illustrates that the secure section 30 of the first portion 28 is aligned with the release section 54 of the second portion 50. The arms 38, 40 are aligned and bear on the walls of cavity 56 of the second portion 50. However, because the release section 54 include the taper 76, the arms 38, 40 are not obstructed from release. The taper 76 allows removal past the both arms 40, 38 of the pivoting portion 36.

In both positions, the second portion 50 is rotated upward relative to the first portion 28. In this rotated condition, the seal 68 is rotated into the curved slot 45 of the first portion 28. The curved slot 45 thereby provides a space for the extended seal 68 of the second portion 50 as it rotates relative to the pivot member 36. In the position illustrated in FIGS. 9A-C, the second hinge portion 50 can be pulled away from the first portion 28 as is indicated by arrows 80.

Figure 10A:
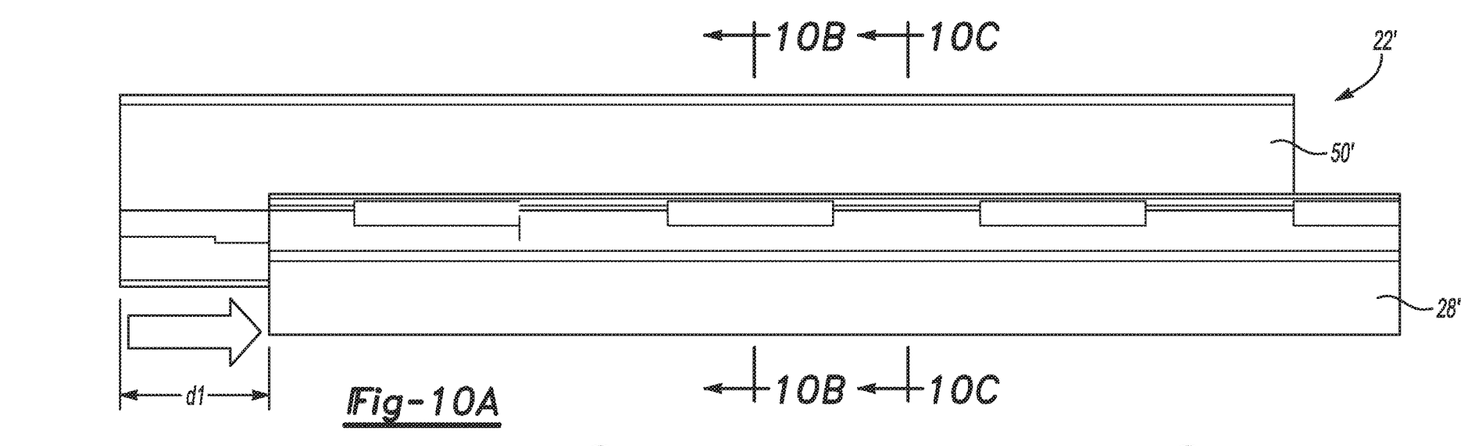
FIG. 10A is a top view of another example hinge assembly in a released position.
Figure 10B:
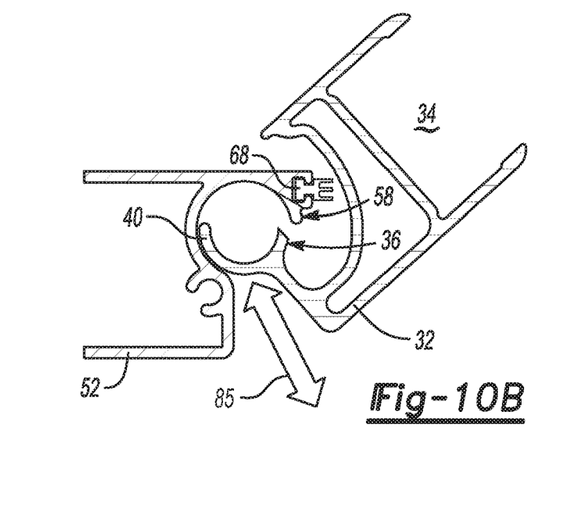
FIG. 10B is a cross-sectional view of a section of the hinge assembly in the released position.
Figure 10C:
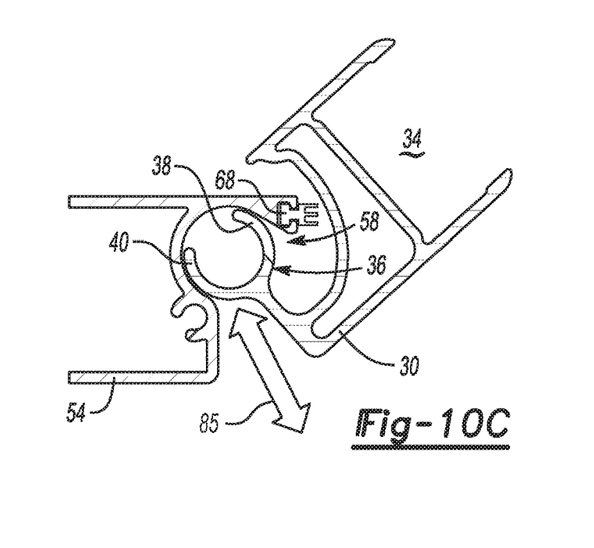
FIG. 10C is a cross-section of another section of the hinge assembly in the released position.

Referring to FIGS. 10A, 10B and 10C, an alternate embodiment of the example hinge assembly 22' is shown and includes a reversal of the first portion 28' and the second portion 50'. In this example, the second portion 50' is stationary and the first portion 28' with the pivoting member 36 is pivotal relative to the second portion 50'. In this example, the cross-sectional shapes are the same as the previous example except that the first portion 28' is pivoted relative to the second portion 50' to the release position as is shown in FIGS. 10A-C. Removal of the first portion 28' occurs in the direction indicated by arrows 85. The reversal of portions enables the guiding along the top of the sides 14 of the cargo area 12 (FIGS. 1a-c) to aid in removal and assembly.

Accordingly, the example hinge assembly for a tonneau cover includes a varying cross-section with different mating configurations that enable removal of a panel without additional tools or structure. Moreover, the different cross-sections provide for securement and rotation to enable folding and storage while still enabling removal of a panel for other alternative uses.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tonneau cover comprising:
a hinge assembly including a first portion attached to a first panel and a second portion attached to a second panel, wherein each of the first portion and the second portion include release sections and secure sections and the second portion is detachable when moved to align the release sections with the secure sections.

2. The tonneau cover as recited in claim 1, wherein the first portion and the second portion include a cross-section that varies between the release sections and the secure sections along a length of the hinge assembly.

3. The tonneau cover as recited in claim 1, wherein the first portion comprises a stationary hinge portion and the second portion comprises a removable hinge portion and the second hinge portion is movable about a pivot axis.

4. The tonneau cover as recited in claim 2, wherein the first portion and the second portion extend along a pivot axis and in a closed position release sections of the first portion are aligned with release sections of the second portion and secure sections of the first portion are aligned with secure sections of the second portion.

5. The tonneau cover as recited in claim 4, wherein in a release position, the second portion is rotated relative to the first portion and the secure sections of the first portion are aligned with release sections of the second portion and secure sections of the second portion are aligned with release sections of the first portion.

6. The tonneau cover as recited in claim 5, wherein the second portion is slide a distance relative to the first portion along the length of the hinge assembly to the release position.

7. The tonneau cover as recited in claim 6, including a plurality of secure sections alternating with a plurality of release sections along a length of both the first portion and the second portion of the hinge assembly.

8. The tonneau cover as recited in claim 7, wherein the distance that the second portion is slide relative to the first portion corresponds with a length of the secure sections and the release sections.

9. The tonneau cover as recited in claim 8, wherein each of the secure sections and the release sections are of equal length.

10. The tonneau cover as recited in claim 2, wherein the first portion defines a cavity and the second portion defines a pivot member receivable within the cavity.

11. The tonneau cover as recited in claim 10, wherein the first portion comprises a stationary portion and the second portion defines a removable portion that is rotatable and slidable relative to the stationary portion.

12. The tonneau cover as recited in claim 10, wherein the second portion comprises a stationary portion and the first portion defines a removable portion that is rotatable and slidable relative to the stationary portion.

13. The tonneau cover as recited in claim 10, including a seal supported on one of the first portion and the second portion that extends the length of the hinge assembly.

14. The tonneau cover as recited in claim 1, including a locking pin preventing sliding movement between the first portion and the second portion.

15. The tonneau cover as recited in claim 1, wherein each of the first portion and the second portion include a channel receiving a corresponding one of the first panel and the second panel.

16. The tonneau cover as recited in claim 1, including a plurality of hinge assemblies pivotally connecting a plurality of panels.

17. A method of removing a portion of a tonneau cover comprising:
rotating a first panel upward relative to a second panel along a length of a hinge assembly pivotally connecting the first panel to the second panel;
aligning release portions of a first portion of the hinge assembly with secure portions of a second portion of the hinge assembly; and
lifting the first panel away from the second panel.

18. The method as recited in claim 17, wherein aligning the release sections of the first portion with secure sections of the second portion comprises sliding the first panel a distance along the length of the hinge assembly less than the overall length of the hinge assembly.

19. The method as recited in claim 18, including locking the first panel to the second panel in a closed position with a locking pin.

20. The method as recited in claim 18, wherein a length of each of the release sections and secure sections is equal to the distance that the first panel is slide relative to the second panel.

* * * * *